| (12) | United States Patent | (10) Patent No.: US 11,964,672 B2 |
|---|---|---|
| | Tomizawa et al. | (45) Date of Patent: Apr. 23, 2024 |

(54) PASSENGER TRANSPORTATION SYSTEM, METHOD OF PASSENGER TRANSPORTATION, AND VEHICLE CONTROLLER

(71) Applicant: TOYOTA JIDOSHA KABUSHIKI KAISHA, Toyota (JP)

(72) Inventors: Ryota Tomizawa, Susono (JP); Shozo Takaba, Chiryu (JP); Ayako Shimizu, Numazu (JP); Hojung Jung, Shizuoka-ken (JP); Daisuke Sato, Toyota (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 17/539,647

(22) Filed: Dec. 1, 2021

(65) Prior Publication Data

US 2022/0250653 A1 Aug. 11, 2022

(30) Foreign Application Priority Data

Feb. 8, 2021 (JP) ................................. 2021-018243

(51) Int. Cl.
*B60W 60/00* (2020.01)
*G05D 1/00* (2024.01)

(52) U.S. Cl.
CPC .... *B60W 60/0016* (2020.02); *B60W 60/0024* (2020.02); *G05D 1/0212* (2013.01); *B60W 2540/01* (2020.02); *B60W 2540/221* (2020.02); *B60W 2720/24* (2013.01)

(58) Field of Classification Search
None
See application file for complete search history.

(56) References Cited

U.S. PATENT DOCUMENTS

| 2012/0112927 | A1* | 5/2012 | Grieco | G08G 1/087 |
|---|---|---|---|---|
| | | | | 340/906 |
| 2019/0391581 | A1* | 12/2019 | Vardaro | A61B 5/02055 |
| 2020/0211140 | A1* | 7/2020 | Horton | G06Q 10/06315 |
| 2021/0188322 | A1 | 6/2021 | Yoshida | |

FOREIGN PATENT DOCUMENTS

JP 2020-046727 A 3/2020

* cited by examiner

*Primary Examiner* — James J Lee
*Assistant Examiner* — Jonathan E Reinert
(74) *Attorney, Agent, or Firm* — Dinsmore & Shohl LLP

(57) ABSTRACT

A passenger transportation system includes: an abnormality determination unit configured to determine whether or not a passenger feeling unwell is present in a vehicle; a transportation planning unit configured to determine, when it is determined that the passenger feeling unwell is present, a medical facility to which the passenger feeling unwell is transported and a via-point where normal passengers are dropped off; and a vehicle control unit configured to control the vehicle to travel so as to transport the passenger feeling unwell to the medical facility via the via-point.

10 Claims, 11 Drawing Sheets

PASSENGER TRANSPORTATION SYSTEM, METHOD OF PASSENGER TRANSPORTATION, AND VEHICLE CONTROLLER

CROSS-REFERENCE TO RELATED APPLICATION

This application claims priority to Japanese Patent Application No. 2021-018243 filed on Feb. 8, 2021, incorporated herein by reference in its entirety.

BACKGROUND

1. Technical Field

The disclosure relates to a passenger transportation system, a method of passenger transportation, and a vehicle controller.

2. Description of Related Art

Japanese Unexamined Patent Application Publication No. 2020-46727 discloses a technique of allowing a vehicle to travel autonomously to a medical facility upon detection of a driver of the vehicle feeling unwell.

SUMMARY

A service of transporting a plurality of passengers using a vehicle that can travel autonomously is being discussed. When any one of the passengers feels unwell during provision of such a service, a travel route of the vehicle is changed to transport the passenger to a medical facility, which may compromise the schedule of other passengers in the vehicle.

Accordingly, an object of the disclosure is to restrain, when a passenger feeling unwell is transported using a vehicle that can travel autonomously, the schedule of other passengers in the vehicle from being compromised.

The outline of the present disclosure is as shown below.

(1) A passenger transportation system includes a vehicle that is able to transport a plurality of passengers by autonomous traveling and a server communicable with the vehicle. The passenger transportation system includes an abnormality determination unit, a transportation planning unit, and a vehicle control unit. The abnormality determination unit is configured to determine whether or not a passenger feeling unwell is present in the vehicle. The transportation planning unit is configured to determine, when it is determined that the passenger feeling unwell is present, a medical facility to which the passenger feeling unwell is transported and a via-point where normal passengers are dropped. The vehicle control unit is configured to control the vehicle to travel so as to transport the passenger feeling unwell to the medical facility via the via-point.

(2) In the passenger transportation system according to the aspect (1), the abnormality determination unit may be configured to monitor the states of the passengers in the vehicle, detect a passenger suspected of feeling unwell based on the states of the passengers, and request other passengers to check whether or not the detected passenger feels unwell.

(3) In the passenger transportation system according to the aspect (1) or (2), when it is determined that the passenger feeling unwell is present and then the passenger in the vehicle refuses transportation to the medical facility, the vehicle control unit may cancel transportation to the medical facility.

(4) The passenger transportation system according to any one of the aspects (1) to (3) may further include a drop-off place acquisition unit configured to acquire a desired drop-off place of the passengers in the vehicle. The vehicle may be a route bus having a service route of the vehicle determined in advance. When a bus stops on the service route closest to the medical facility is ahead of the current position of the vehicle and behind one of the desired drop-off place of the normal passengers, the vehicle control unit may direct the vehicle to the desired drop-off place after the vehicle arrives at the medical facility.

(5) The passenger transportation system according to any one of the aspects (1) to (4) may further include a vehicle dispatch unit configured to dispatch a vehicle to the via-point.

(6) In the passenger transportation system according to any one of the aspects (1) to (5), the vehicle may be a route bus having a service route of the vehicle determined in advance, and the transportation planning unit may select a bus stop on the service route of the vehicle as the via-point.

(7) In the passenger transportation system according to the aspect (6), the transportation planning unit may select a bus stop that is located ahead of the current position of the vehicle on the service route and closest to the current position of the vehicle as the via-point.

(8) The passenger transportation system according to any one of the aspects (1) to (7) may further include a signal control unit configured to control a lighting state of a traffic signal. The signal control unit may control the lighting state of the traffic signal such that the vehicle does not stop at the traffic signal when the vehicle transports the passenger feeling unwell to the medical facility.

(9) The passenger transportation system according to any one of the aspects (1) to (8) may further include a travel instruction unit configured to provide a travel instruction to another vehicle other than the vehicle. The travel instruction unit may provide a travel instruction to the other vehicle so as to prevent the other vehicle from being located ahead of the vehicle when the vehicle transports the passenger feeling unwell to the medical facility.

(10) A method of passenger transportation using a vehicle that is able to transport a plurality of passengers by autonomous traveling includes: determining whether or not a passenger feeling unwell is present in the vehicle; determining, when it is determined that the passenger feeling unwell is present, a medical facility to which the passenger feeling unwell is transported and a via-point where normal passengers are dropped; and controlling the vehicle to travel so as to transport the passenger feeling unwell to the medical facility via the via-point.

(11) A vehicle controller provided in a vehicle that is able to transport a plurality of passengers by autonomous traveling includes: an abnormality determination unit, a transportation planning unit, and a vehicle control unit. The abnormality determination unit is configured to determine whether or not a passenger feeling unwell is present in the vehicle. The transportation planning unit is configured to determine, when it is determined that the passenger feeling unwell is present, a medical facility to which the passenger feeling unwell is transported and a via-point where normal passengers are dropped. The vehicle control unit is configured to control the vehicle to travel so as to transport the passenger feeling unwell to the medical facility via the via-point.

The disclosure makes it possible to restrain, when a passenger feeling unwell is transported using a vehicle that can travel autonomously, the schedule of other passengers in the vehicle from being compromised.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the drawings. In the following description, like component members are designated by like reference numbers.

First Embodiment

A first embodiment of the disclosure will be described first with reference to FIGS. 1 to 8.

Configuration of Passenger Transportation System

Figure 1:
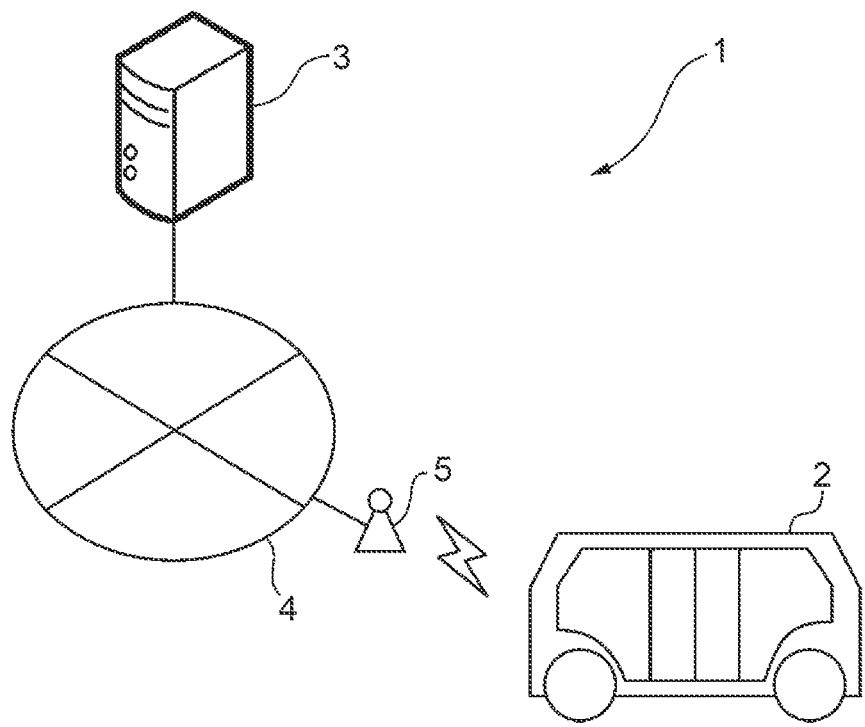
FIG. 1 is a schematic configuration diagram of a passenger transportation system according to a first embodiment of the disclosure.

FIG. 1 is a schematic configuration diagram of a passenger transportation system 1 according to the first embodiment of the disclosure. As shown in FIG. 1, the passenger transportation system 1 includes a vehicle 2, and an external server 3 of the vehicle 2. The vehicle 2 and the server 3 can communicate with each other via a communication network 4 and a wireless base station 5.

The vehicle 2 is configured to travel autonomously. Specifically, in the vehicle 2, all the operations related to acceleration, steering, and deceleration (braking) of the vehicle 2 are automatically controlled, without the need for a driver to drive the vehicle 2. The autonomous traveling is also referred to as automated driving, and the vehicle 2 is a so-called automated vehicle.

The vehicle 2 is also provided with a plurality of seats, and is able to transport a plurality of passengers by autonomous traveling. In the present embodiment, the vehicle 2 is a route bus having a service route of the vehicle 2 determined in advance. Therefore, the vehicle 2 stops at each bus stop on the service route for picking up and dropping off passengers.

Figure 2:
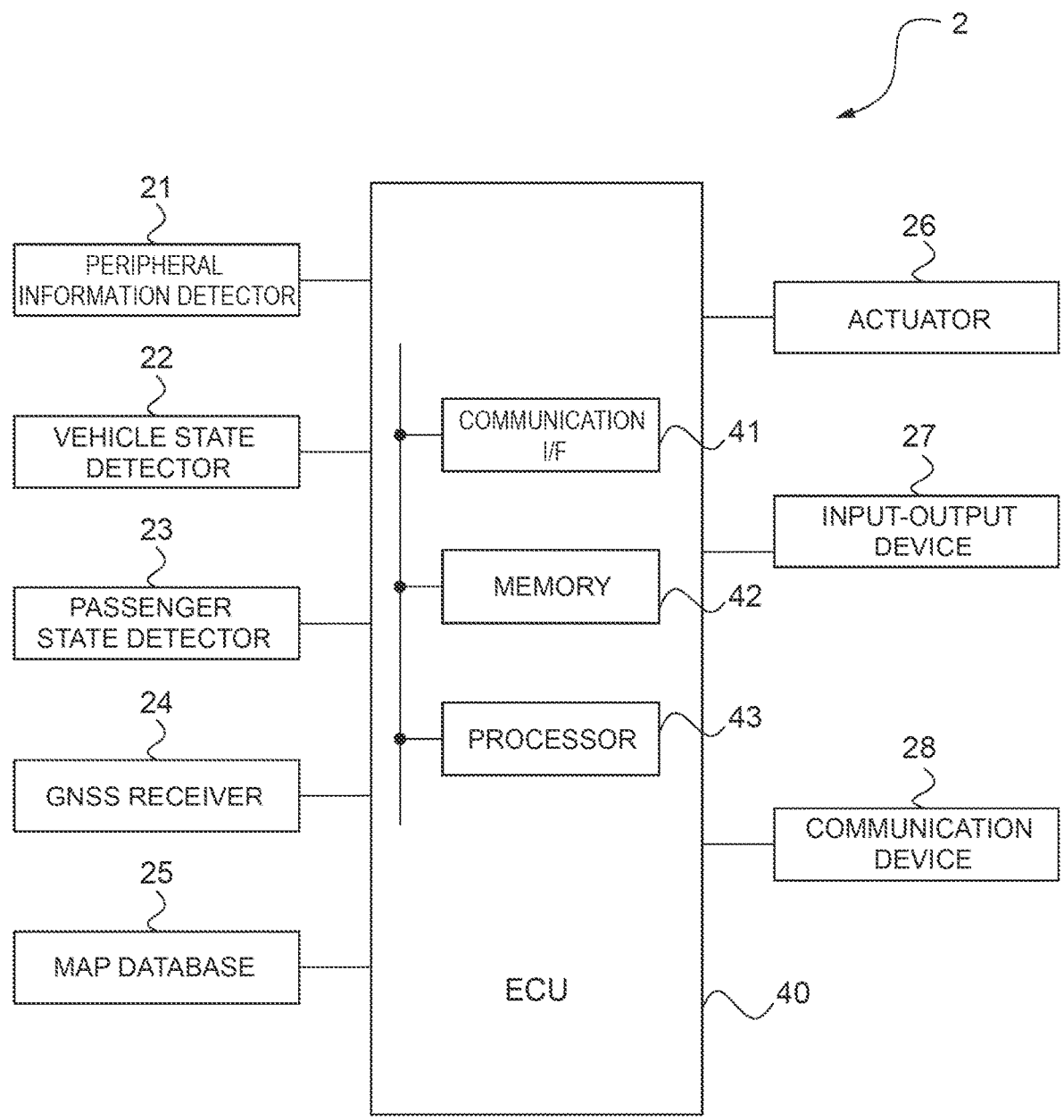
FIG. 2 schematically shows the configuration of a vehicle in FIG. 1.

FIG. 2 schematically shows the configuration of the vehicle 2 in FIG. 1. As shown in FIG. 2, the vehicle 2 includes an electronic control unit (ECU) 40. The ECU 40 includes a communication interface 41, a memory 42, and a processor 43, and executes various controls of the vehicle 2. The communication interface 41 and the memory 42 are connected to the processor 43 via signal lines. The ECU 40 is an example of the controller of the vehicle 2 provided in the vehicle 2. In the present embodiment, although one ECU 40 is provided, a plurality of ECUs may be provided for respective functions.

The communication interface 41 has an interface circuit for connecting the ECU 40 to an in-vehicle network in conformity with the standards of the controller area network (CAN) or the like. The ECU 40 communicates with in-vehicle devices (other ECUs, etc.) connected to the in-vehicle network via the communication interface 41 and the in-vehicle network. The communication interface 41 is an example of the communication unit of the ECU 40.

For example, the memory 42 has a volatile semiconductor memory (for example, RAM) and a non-volatile semiconductor memory (for example, ROM). The memory 42 stores computer programs executed by the processor 43 and various data used when the processor 43 executes various processes. The memory 42 is an example of the storage unit of the ECU 40.

The processor 43 has one or more central processing units (CPUs) and their peripheral circuits, and executes various processes. The processor 43 may further have other operation circuits, such as a logical operation unit, a numerical operation unit, or a graphic processing unit.

As shown in FIG. 2, the vehicle 2 also includes a peripheral information detector 21, a vehicle state detector 22, a passenger state detector 23, a GNSS receiver 24, a map database 25, an actuator 26, an input-output device 27, and a communication device 28. Each of these in-vehicle devices is electrically connected to the ECU 40.

The peripheral information detector 21 detects information around the vehicle 2. The peripheral information includes information about articles such as lane markings on roads, other vehicles, pedestrians, bicycles, buildings, signs, traffic lights, and obstacles. For example, the peripheral information detector 21 includes external cameras, millimeter-wave radars, laser imaging detection and ranging (LIDAR), and ultrasonic sensors. Output from the peripheral information detector 21, i.e., the information around the vehicle 2 detected by the peripheral information detector 21, is transmitted to the ECU 40 and is input into the processor 43 of the ECU 40 via the input interface of the ECU 40 or the like.

The vehicle state detector 22 detects state quantities of the vehicle 2. The state quantities of the vehicle 2 include a speed (vehicle speed), an acceleration, a rudder angle, and a yaw rate of the vehicle 2. The vehicle state detector 22 includes a vehicle speed sensor, an acceleration sensor, a rudder angle sensor, and a yaw rate sensor. Output from the vehicle state detector 22, i.e., the state quantities of the vehicle 2 detected by the vehicle state detector 22, is transmitted to the ECU 40 and is input into the processor 43 of the ECU 40 via the input interface of the ECU 40 or the like.

The passenger state detector 23 detects the states of the passengers of the vehicle 2. For example, the passenger state detector 23 includes in-vehicle cameras that generate images of the passengers, seat belt sensors that detect whether seat belts are fastened, seat position sensors that detect whether passengers are seated on the seats, and information readers that read passenger information. Output from the passenger state detector 23, i.e., the states of the passengers of the vehicle 2 detected by the passenger state detector 23, is transmitted to the ECU 40 and is input into the processor 43 of the ECU 40 via the input interface of the ECU 40 or the like.

The GNSS receiver 24 is configured to receive positioning information from a plurality of (for example, three or more) global satellites and detect the current position (for example, a latitude and a longitude of the vehicle 2) of the vehicle 2. Specifically, the GNSS receiver 24 captures a plurality of positioning satellites and receives radio waves transmitted from the positioning satellites. The GNSS receiver 24 then calculates the distance to the positioning satellites based on the difference between the transmission time and the reception time of the radio waves, and detects the current position of the vehicle 2 based on the distance to the positioning satellites and the position of the positioning satellites (orbit information). Output from the GNSS receiver 24, i.e., the current position of the vehicle 2 detected by the GNSS receiver 24, is transmitted to the ECU 40 and is input into the processor 43 of the ECU 40 via the input interface of the ECU 40 or the like.

The global navigation satellite system (GNSS) is a general term of the satellite positioning systems such as GPS in the United States, GLONASS in Russia, Galileo in Europe, QZSS in Japan, BeiDou in China, and IRNSS in India. Therefore, the GNSS receiver 24 includes a GPS receiver.

The map database 25 stores three-dimensional map information such as road surface information, lane information, and building position information. The map stored in the map database 25 is a so-called high-precision map. The processor 43 of the ECU 40 acquires the map information from the map database 25. The map information stored in the map database 25 may be updated regularly through communication with the outside of the vehicle 2, a simultaneous localization and mapping (SLAM) technology, and the like. The server 3 may include map databases, and the processor 43 of the ECU 40 may acquire map information from the server 3.

The actuator 26 operates the vehicle 2. For example, the actuator 26 includes a drive unit (at least one of an engine and a motor) for acceleration of the vehicle 2, a brake actuator for deceleration (braking) of the vehicle 2, a steering motor for steering the vehicle 2, and door actuators for opening and closing doors of the vehicle 2. The processor 43 of the ECU 40 controls the actuator 26 to allow autonomous traveling of the vehicle 2.

The input-output device 27 is used for information input and output between the vehicle 2 and the passengers. The input-output device 27 includes, for example, a display that displays information, a speaker that generates sound, an operation button or operation switch that allows the passengers to perform input operation, and a microphone that receives voice of the passengers. The input-output device 27 informs various information output from the processor 43 of the ECU 40 to the passengers of the vehicle 2. The input-output device 27 also transmits information input by the passengers or the like to the processor 43 of the ECU 40. The input-output device 27 is also referred to as a human machine interface (HMI). Note that mobile terminals (e.g., smartphones, tablet devices, etc.) of the passengers may be connected to the in-vehicle network of the vehicle 2 in a wireless or wired manner to function as the input-output devices.

The communication device 28 is a device (e.g., data communication module (DCM)) that allows communication between the vehicle 2 and the outside of the vehicle 2. The communication device 28 accesses the wireless base station 5 so as to connect to the communication network 4 via the wireless base station 5. The ECU 40 communicates with the server 3 via the communication device 28, the wireless base station 5, and the communication network 4.

Figure 3:
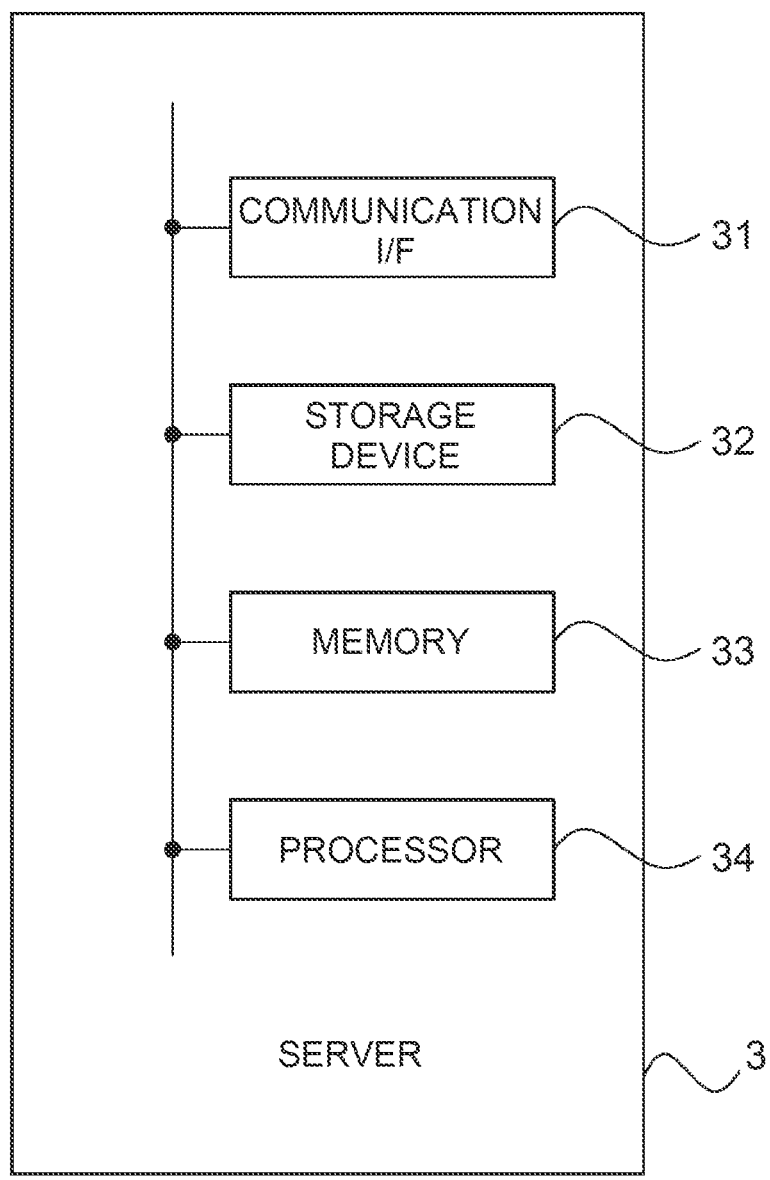
FIG. 3 schematically shows the configuration of a server in FIG. 1.

FIG. 3 schematically shows the configuration of the server 3 in FIG. 1. The server 3 includes a communication interface 31, a storage device 32, a memory 33, and a processor 34. The communication interface 31, the storage device 32, and the memory 33 are connected to the processor 34 via signal lines. Note that the server 3 may further include an input device such as a keyboard and a mouse, an output device such as a display, and the like. The server 3 may be constituted of a plurality of computers.

The communication interface 31 has an interface circuit for connecting the server 3 to the communication network 4. The server 3 communicates with the vehicle 2 via the communication network 4 and the wireless base station 5. The communication interface 31 is an example of the server 3.

The storage device 32 includes, for example, a hard disk drive (HDD), a solid-state drive (SDD), or an optical recording medium, and a device for accessing thereto. The storage device 32 stores various data, and stores, for example, vehicle information, passenger information, map information, and computer programs for the processor 34 to execute various processes. The storage device 32 is an example of the storage unit of the server 3.

The memory 33 has a non-volatile semiconductor memory (for example, RAM). The memory 33 temporarily stores various data used when the processor 34 executes various processes. The memory 33 is an example of the storage unit of the server 3.

The processor 34 has one or more CPUs and their peripheral circuits, and executes various processes. The processor 34 may further have other operation circuits, such as a logical operation unit, a numerical operation unit, or a graphic processing unit.

Control of Passenger Transportation System

Figure 4:
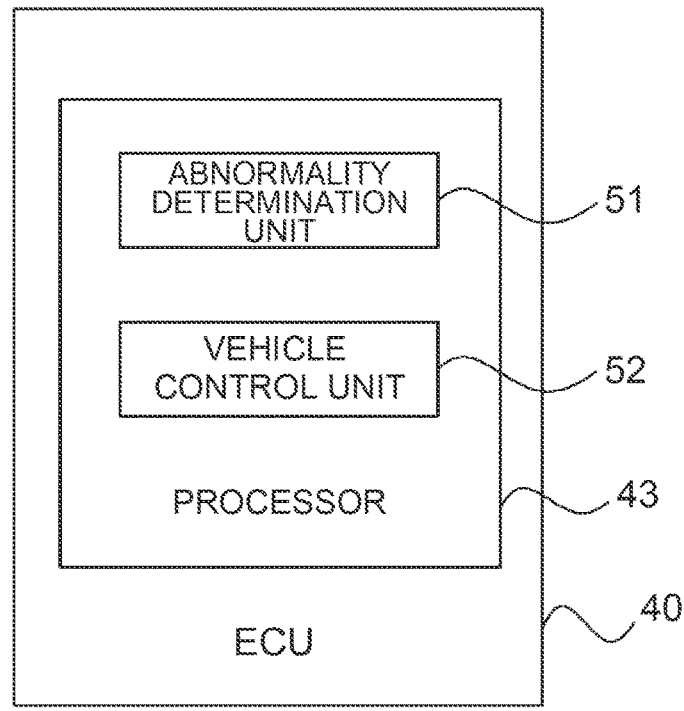
FIG. 4 is a functional block diagram of a processor of an ECU in the first embodiment.

FIG. 4 is a functional block diagram of the processor 43 of the ECU 40 in the first embodiment. In the present embodiment, the processor 43 has an abnormality determination unit 51 and a vehicle control unit 52. The abnormality determination unit 51 and the vehicle control unit 52 are functional modules that are implemented when the processor 43 of the ECU 40 executes computer programs stored in the memory 42 of the ECU 40. Each of these functional modules may be implemented by a dedicated operation circuit provided in the processor 43.

The abnormality determination unit 51 determines whether or not a passenger feeling unwell is present in the vehicle 2. For example, the abnormality determination unit 51 determines that the passenger feeling unwell is present in the vehicle 2 when passenger abnormality in the vehicle 2 is reported via the input-output device 27. In this case, input of abnormality into the input-output device 27 is made by the passenger feeling unwell or by a passenger therearound through operation of the operation button or the operation switch, voice input, or the like.

The vehicle control unit 52 controls the vehicle 2. For example, the vehicle control unit 52 uses the actuator 26 to control traveling of the vehicle 2 such that the vehicle 2 safely travels along a predetermined travel route.

Figure 5:
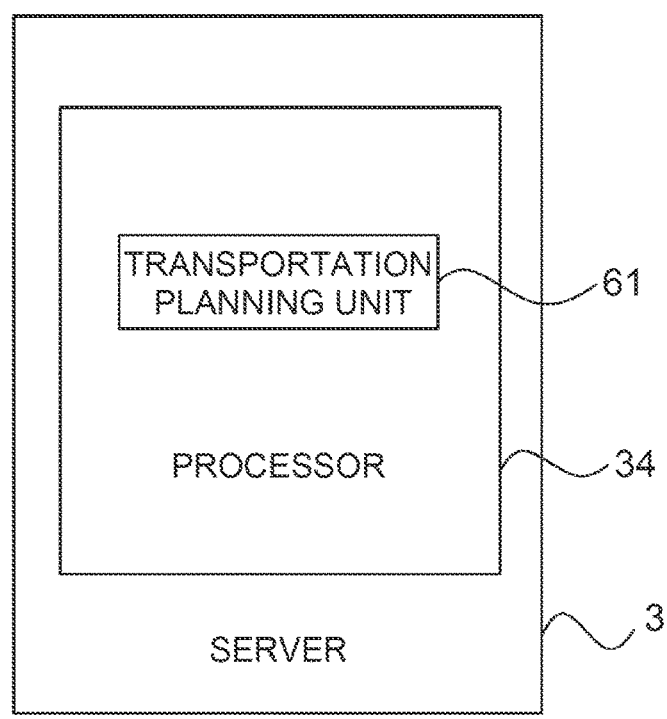
FIG. 5 is a functional block diagram of a processor of the server in the first embodiment.

FIG. 5 is a functional block diagram of the processor 34 of the server 3 in the first embodiment. In the present embodiment, the processor 34 has a transportation planning unit 61. The transportation planning unit 61 is a functional module that is implemented when the processor 34 of the server 3 executes computer programs stored in the storage device 32 of the server 3. The transportation planning unit 61 may be implemented by a dedicated operation circuit provided in the processor 43.

The transportation planning unit 61 makes a transportation plan to transport a passenger feeling unwell in the vehicle 2 to a medical facility. Specifically, when the abnormality determination unit 51 of the vehicle 2 determines that the passenger feeling unwell is present in the vehicle 2, the transportation planning unit 61 determines a medical facility to which the passenger feeling unwell is transported and a via-point where normal passengers are dropped off.

Based on the transportation plan made by the transportation planning unit 61, the vehicle 2 transports the passenger feeling unwell to a medical facility. Specifically, the vehicle 2 drops off the normal passengers at the via-point determined in the transportation plan, and then transports the passenger feeling unwell to the medical facility determined in the transportation plan. In other words, the vehicle control unit 52 of the vehicle 2 controls the vehicle 2 to travel so as to transport the passenger feeling unwell to the medical facility via the via-point.

This makes it possible to smoothly transport the passenger feeling unwell, while restraining the time of the normal passengers from being wasted due to a movement to the medical facility. Therefore, when the passenger feeling unwell is transported using the vehicle 2 that can travel autonomously, it is possible to restrain the schedule of other passengers in the vehicle 2 from being compromised.

Hereinafter, a detailed description will be given of the control with reference to a flowchart of FIG. 6 and a sequence diagram of FIG. 7.

Figure 6:
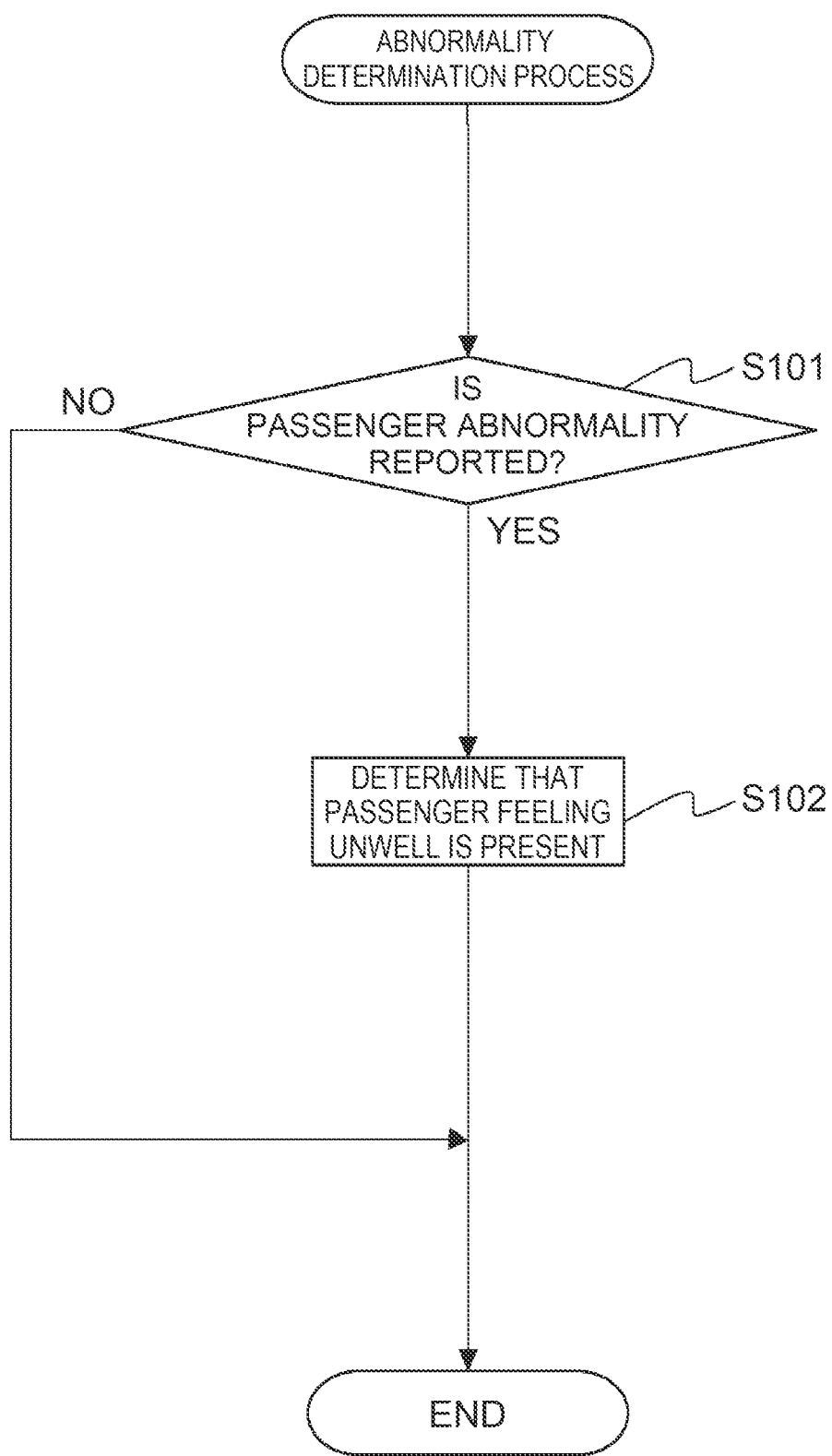
FIG. 6 is a flowchart showing a control routine for an abnormality determination process in the first embodiment of the disclosure.

FIG. 6 is a flowchart showing a control routine for an abnormality determination process in the first embodiment of the disclosure. The processor 43 of the ECU 40 repeatedly executes the control routine at specified execution intervals.

First, in step S101, the abnormality determination unit 51 determines whether or not passenger abnormality in the vehicle 2 is reported via the input-output device 27. When the abnormality determination unit 51 determines that no passenger abnormality is reported, the control routine is ended. When the abnormality determination unit 51 determines that the passenger abnormality is reported, the control routine proceeds to step S102.

In step S102, the abnormality determination unit 51 determines that a passenger feeling unwell is present in the vehicle 2. After step S102, the control routine is ended.

Figure 7:
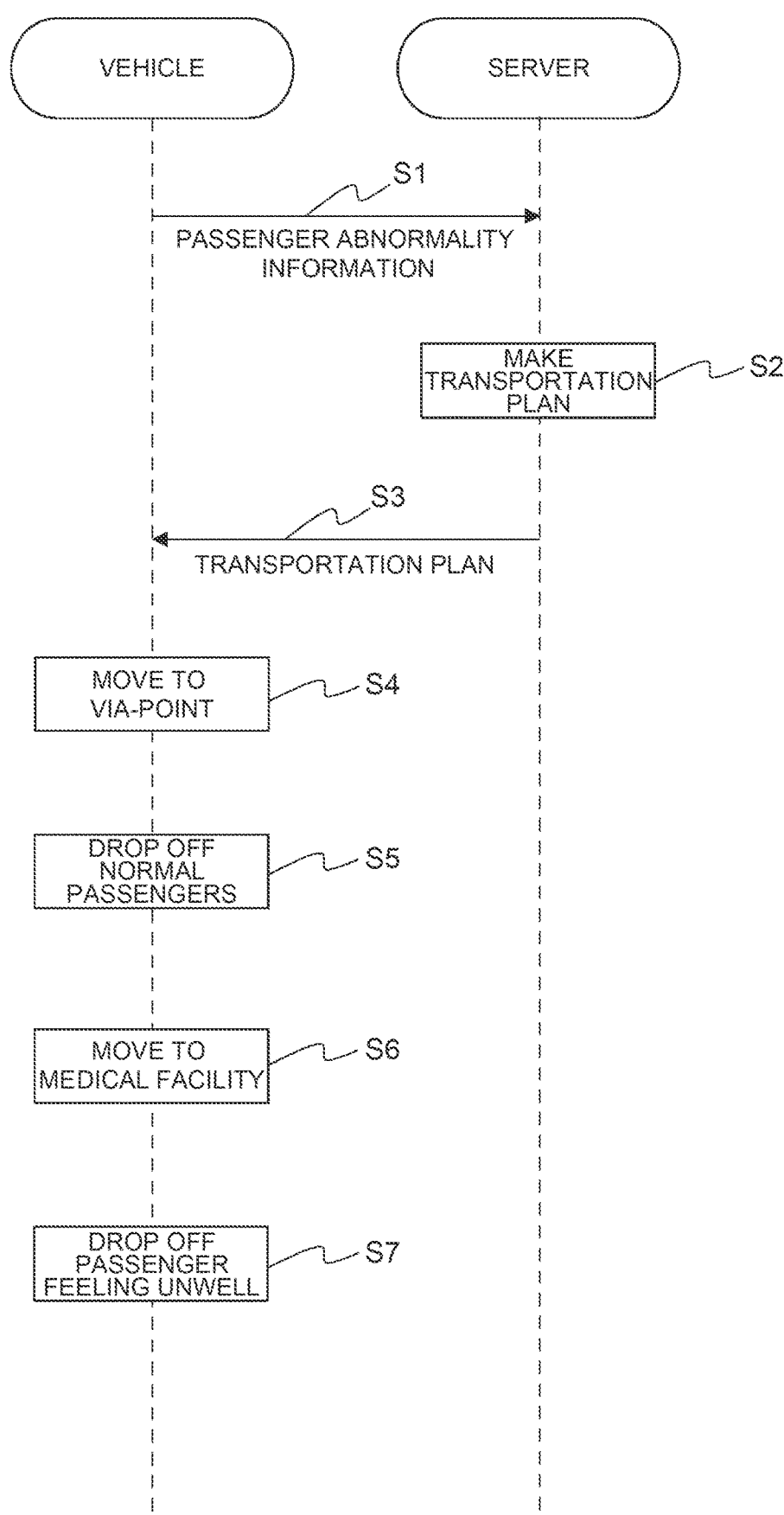
FIG. 7 is a sequence diagram showing an example of the operation of the passenger transportation system according to the first embodiment of the disclosure.

FIG. 7 is a sequence diagram showing an example of the operation of the passenger transportation system 1 according to the first embodiment of the disclosure. In the sequence diagram, communication between the vehicle 2 and the server 3 is performed via the communication network 4 and the wireless base station 5.

When it is determined in the control routine of FIG. 6 that a passenger feeling unwell is present, the abnormality determination unit 51 of the vehicle 2 reports the presence of the passenger feeling unwell in the vehicle 2 to the server 3 by transmitting passenger abnormality information to the server 3 (step S1). The passenger abnormality information includes the current position of the vehicle 2, i.e., the position of the vehicle 2 when the passenger gets to feel unwell, identification information on the vehicle 2 (for example, the identification number of the vehicle 2), and the number of passengers.

The current position of the vehicle 2 is detected by the GNSS receiver 24. The identification information on the vehicle 2 is stored in the memory 42 of the ECU 40 or in other storage devices of the vehicle 2. The number of passengers is identified based on the output from the passenger state detector 23.

Upon reception of the passenger abnormality information from the vehicle 2, the transportation planning unit 61 of the server 3 makes a transportation plan to transport the passenger feeling unwell in the vehicle 2 to a medical facility (step S2). Specifically, the transportation planning unit 61 determines a medical facility to which the passenger feeling unwell is transported and a via-point where normal passengers are dropped off. The transportation planning unit 61 also generates a travel route from the current position of the vehicle 2 to the medical facility via the via-point.

Figure 8:
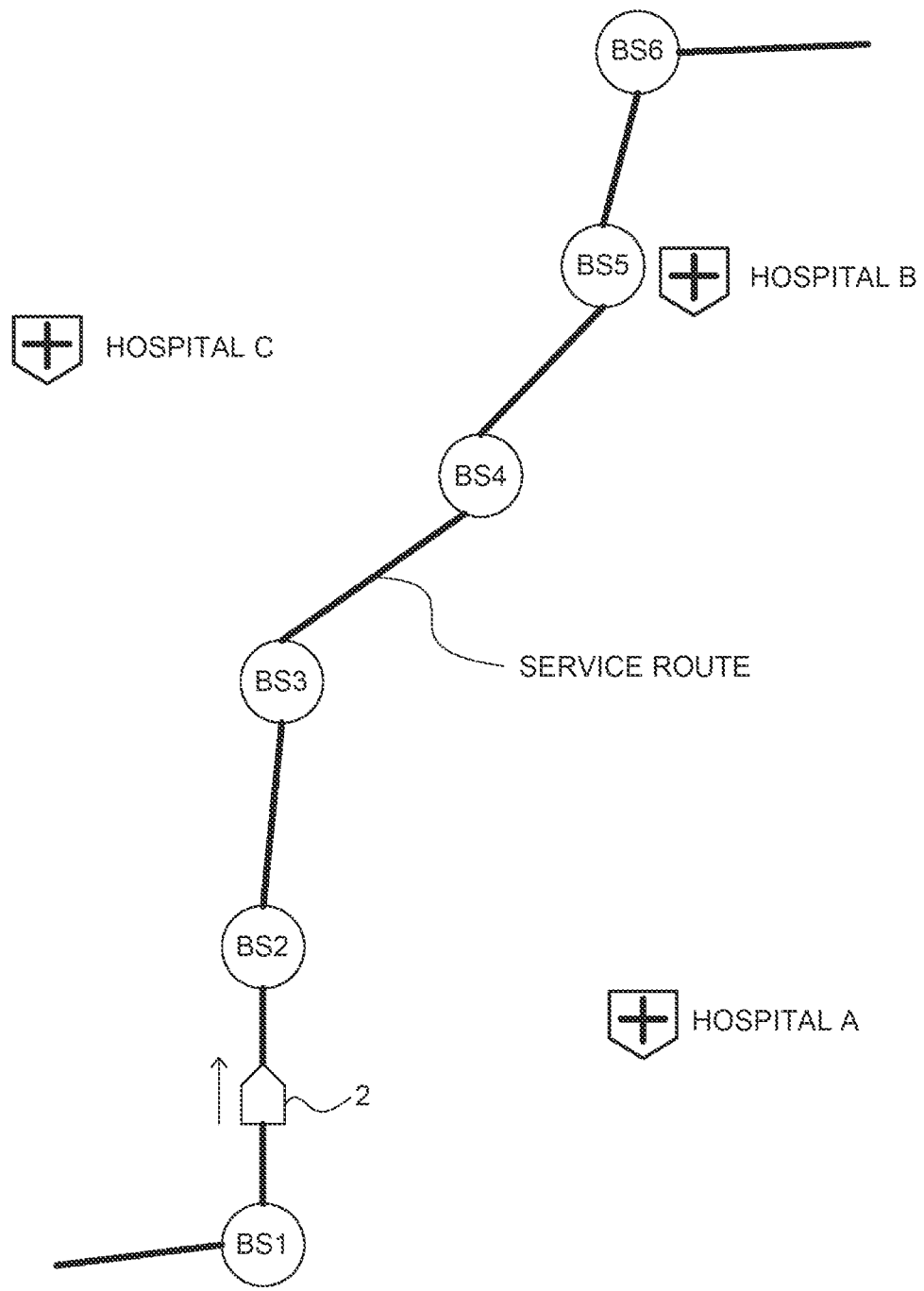
FIG. 8 shows an example of the situation where the vehicle travels along a service route.

For example, the transportation planning unit 61 selects, out of a plurality of medical facilities preselected as a transportation destination, the medical facility closest to the current position of the vehicle 2 as the medical facility to which the passenger feeling unwell is transported. In this case, in the situation as shown in FIG. 8, a hospital A that is closest to the current position of the vehicle 2 is selected as the medical facility to which the passenger feeling unwell is transported.

The transportation planning unit 61 may select the medical facility closest to a bus stop that is located ahead of the current position of the vehicle 2 on the service route of the vehicle 2 as the medical facility to which the passenger feeling unwell is transported. In this case, in the situation as shown in FIG. 8, a hospital B that is closest to a bus stop BS5 on the travel route of the vehicle 2 is selected as the medical facility to which the passenger feeling unwell is transported. In this case, the transportation planning unit 61 may also generate a travel route to the medical facility such that a service route from the current position of the vehicle 2 to the bus stop closest to the medical facility is included in the travel route. This makes it possible to restrain the vehicle 2 from traveling on the roads out of the service route, and to enhance the safety of autonomous traveling at the time of transporting the passenger feeling unwell.

The transportation planning unit 61 also selects, for example, a bus stop on the service route of the vehicle 2 as the via-point where normal passengers are dropped off. In this case, the normal passengers can use another vehicle that arrives at the bus stop that is the via-point, which enables the normal passengers to secure the mode for transportation to their destinations.

In the present embodiment in particular, the bus stop that is located ahead of the current position of the vehicle 2 on the service route of the vehicle 2 and closest to the current position of the vehicle 2 is selected as the via-point. In this case, in the situation as shown in FIG. 8, a bus stop BS2 that the vehicle 2 is going to stop next is selected as the via-point. This makes it possible to prevent the vehicle 2 from moving away from the destinations of the normal passengers when the vehicle 2 travels from the current position to the via-point, and to effectively restrain the time of the normal passengers from being wasted.

Note that the transportation planning unit 61 may select a taxi stand or a bus stop on the service route of another vehicle as the via-point. This enables the normal passengers to easily use other modes of transportation. In this case, for example, a taxi stand or bus stop closest to the current position of the vehicle 2, or a taxi stand or bus stop on a travel route from the current position of the vehicle 2 to the medical facility is selected.

Next, the transportation planning unit 61 of the server 3 transmits the transportation plan to the vehicle 2 (step S3). The transportation plan includes position information on the via-point and the medical facility, and the travel route of the vehicle 2. The transportation planning unit 61 may inform the medical facility about the transportation of the passenger feeling unwell and the estimated time of arrival of the vehicle 2 at the medical facility via the communication network 4.

Upon reception of the transportation plan from the server 3, the vehicle 2 travels toward the via-point (step S4). Specifically, the vehicle control unit 52 of the vehicle 2 causes the vehicle 2 to travel to the via-point along the travel route transmitted from the server 3. In this case, the vehicle control unit 52 may inform the passengers of the vehicle 2 about termination of the normal operation of the vehicle 2, the position information on the via-point, and the like, via the input-output device 27.

The vehicle 2 then drops off the normal passengers from the vehicle 2 when arriving at the via-point (step S5). For example, the vehicle control unit 52 of the vehicle 2 stops the vehicle 2 at the via-point, and uses the door actuator in the actuator 26 to open the doors of the vehicle 2 for a prescribed time. In this case, the vehicle control unit 52 may determine whether or not the passengers have left the vehicle 2 based on the output of the passenger state detector 23. The vehicle control unit 52 may also prompt the passengers to leave the vehicle by using the input-output device 27 or by voice or display.

After dropping off the normal passengers, the vehicle 2 travels toward the medical facility (step S6). Specifically, the vehicle control unit 52 of the vehicle 2 causes the vehicle 2 to travel from the via-point to the medical facility along the travel route transmitted from the server 3.

Then, once the vehicle 2 arrives at the medical facility, the passenger feeling unwell is taken out of the vehicle 2 (step S7). For example, the vehicle control unit 52 of the vehicle 2 stops the vehicle 2 at the medical facility, and uses the door actuator in the actuator 26 to open the doors of the vehicle 2 for a prescribed time. In this case, for example, the passenger feeling unwell is taken out of the vehicle 2 by a staff member of the medical facility. The vehicle control unit 52 may inform the medical facility that the vehicle 2 has arrived at the medical facility via the wireless base station 5 and the communication network 4, or via short-distance radio communication between the vehicle 2 and the medical facility. The vehicle control unit 52 may also inform the medical facility that the vehicle 2 has arrived at the medical facility by the sound of a horn of the vehicle 2 or the like.

The travel route of the vehicle 2 from the current position to the medical facility via the via-point may be generated by the vehicle control unit 52 of the vehicle 2 instead of the transportation planning unit 61 of the server 3. In this case, the position information on the via-point and the medical facility is transmitted from the server 3 to the vehicle 2 as a transportation plan.

When the abnormality determination unit 51 determines that a passenger feeling unwell is present and then the passenger in the vehicle 2 refuses transportation to the medical facility, the vehicle control unit 52 may cancel transportation to the medical facility, and return the vehicle 2 to normal operation. This makes it possible to avoid transportation to the medical facility due to operation error in the input-output device 27 or the like.

Moreover, instead of the processor 43 of the ECU 40, the processor 34 of the server 3 may have the abnormality determination unit. In that case, the abnormality determination unit of the server 3 determines whether or not a passenger feeling unwell is present in the vehicle 2 based on the output of the input-output device 27 transmitted from the vehicle 2.

Moreover, instead of the processor 43 of the ECU 40, the processor 34 of the server 3 may have the vehicle control unit. In this case, the vehicle control unit of the server 3 uses the actuator 26 to remotely control the vehicle 2 by communicating with the vehicle 2.

Moreover, instead of the processor 34 of the server 3, the processor 43 of the ECU 40 may have the transportation planning unit.

Second Embodiment

The passenger transportation system according to a second embodiment is basically similar in configuration and control to the passenger transportation system according to the first embodiment except for the points described below. Therefore, the second embodiment of the disclosure will be described with the focus being on the difference from the first embodiment.

In the second embodiment, the abnormality determination unit 51 monitors the states of the passengers in the vehicle 2, and determines whether or not a passenger feeling unwell is present in the vehicle 2 based on the states of the passengers. This makes it possible to detect the passenger feeling unwell without relying on notification from the passengers in the vehicle 2. However, in this case, passenger abnormality may be erroneously detected in such a case where a passenger is asleep.

Accordingly, the abnormality determination unit 51 monitors the states of the passengers in the vehicle 2 based on the output from the passenger state detector 23, detects a passenger suspected of feeling unwell based on the states of the passengers, and requests other passengers to confirm whether or not the detected passenger feels unwell. This makes it possible to reduce the erroneous detection of passenger abnormality.

Figure 9:
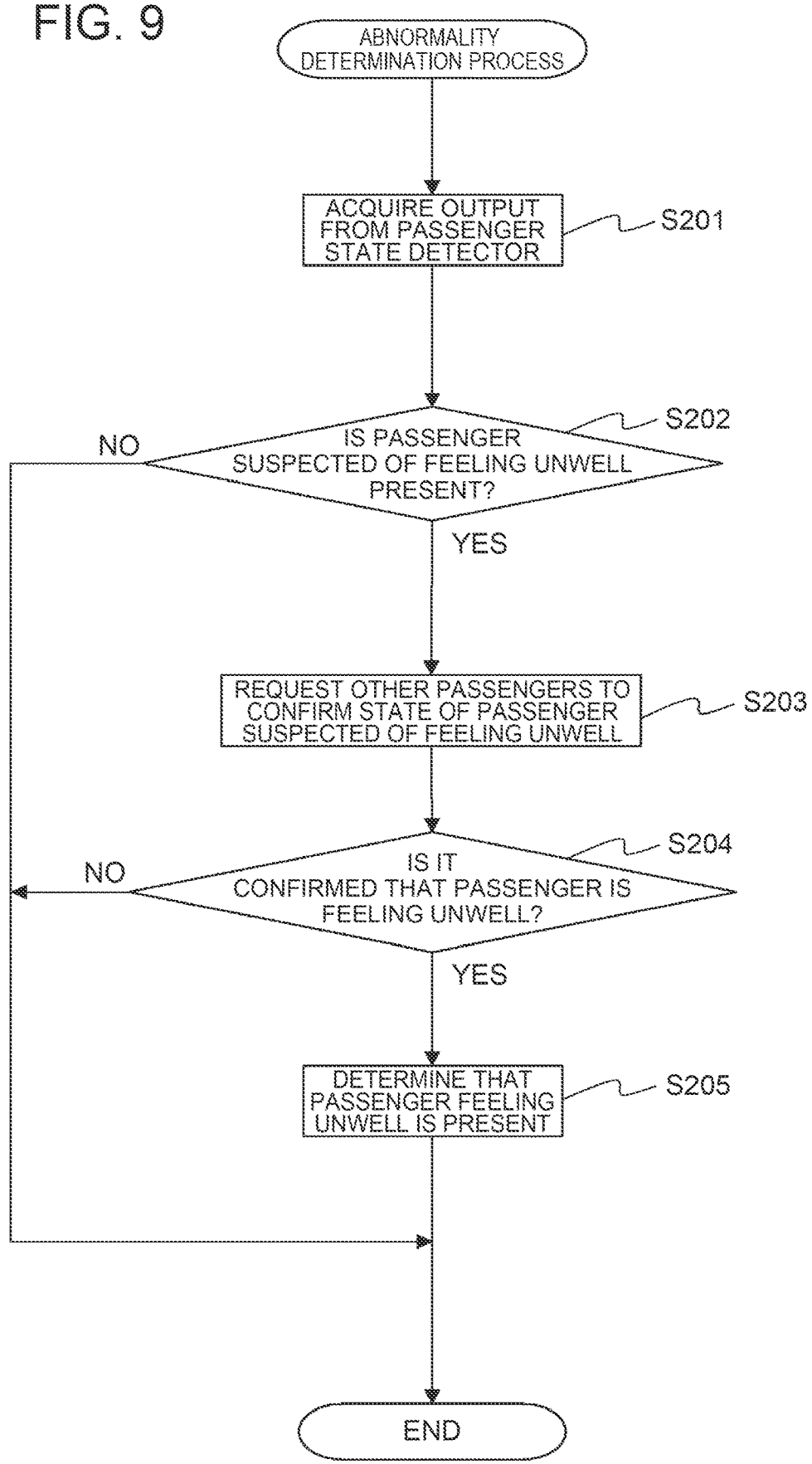
FIG. 9 is a flowchart showing the control routine for the abnormality determination process in a second embodiment of the disclosure.

FIG. 9 is a flowchart showing the control routine for the abnormality determination process in the second embodiment of the disclosure. The processor 43 of the ECU 40 repeatedly executes the control routine at specified execution intervals.

First, in step S201, the abnormality determination unit 51 acquires output from the passenger state detector 23.

Next, in step S202, the abnormality determination unit 51 determines based on the output from the passenger state detector 23 whether or not a passenger suspected of feeling unwell is present in the vehicle 2. For example, the abnormality determination unit 51 determines that the passenger suspected of feeling unwell is present, when passenger abnormality (collapsed, fainted, etc.) is detected from passenger images generated by in-vehicle cameras of the passenger state detector 23. For example, the detection of passenger abnormality based on the passenger images is performed using a machine learning model such as a neural network model.

When the abnormality determination unit 51 determines that a passenger suspected of feeling unwell is not present in step S202, the control routine is ended. Meanwhile, when the abnormality determination unit 51 determines that the passenger suspected of feeling unwell is present in step S202, the control routine proceeds to step S203.

In step S203, the abnormality determination unit 51 requests other passengers to confirm whether or not the passenger suspected of feeling unwell feels unwell via the input-output device 27. In this case, the abnormality determination unit 51 may inform other passengers of the position information (seat number, etc.) on the passenger suspected of feeling unwell.

Next, in step S204, the abnormality determination unit 51 determines whether or not other passengers have confirmed that the passenger suspected of feeling unwell feels unwell. Other passengers input the result of confirmation into the input-output device 27, and the abnormality determination unit 51 acquires the result from the input-output device 27.

When the abnormality determination unit 51 determines in step S204 that other passengers have confirmed that the passenger suspected of feeling unwell does not feel unwell, the control routine is ended. When the abnormality determination unit 51 determines that other passengers have confirmed that the passenger suspected of feeling unwell feels unwell in step S204, the control routine proceeds to step S205.

In step S205, the abnormality determination unit 51 determines that the passenger feeling unwell is present in the vehicle 2. After step S205, the control routine is ended.

The abnormality determination unit 51 may transmit images (static images or videos) of the passenger suspected of feeling unwell to the server 3, and an operator of the server 3 may confirm whether or not the passenger suspected of feeling unwell feels unwell. In this case, a voice call may be made between the operator of the server 3 and the passenger in the vehicle 2 via the input-output device 27.

Moreover, instead of the processor 43 of the ECU 40, the processor 34 of the server 3 may have the abnormality determination unit. In that case, the abnormality determination unit of the server 3 determines whether or not a passenger suspected of feeling unwell is present in the vehicle 2 based on the output of the passenger state detector 23 transmitted from the vehicle 2, and requests other passengers to confirm whether or not the passenger suspected of feeling unwell feels unwell via the input-output device 27.

Third Embodiment

The passenger transportation system according to a third embodiment is basically similar in configuration and control to the passenger transportation system according to the first embodiment except for the points described below. Therefore, the third embodiment of the disclosure will be described with the focus being on the difference from the first embodiment.

Figure 10:
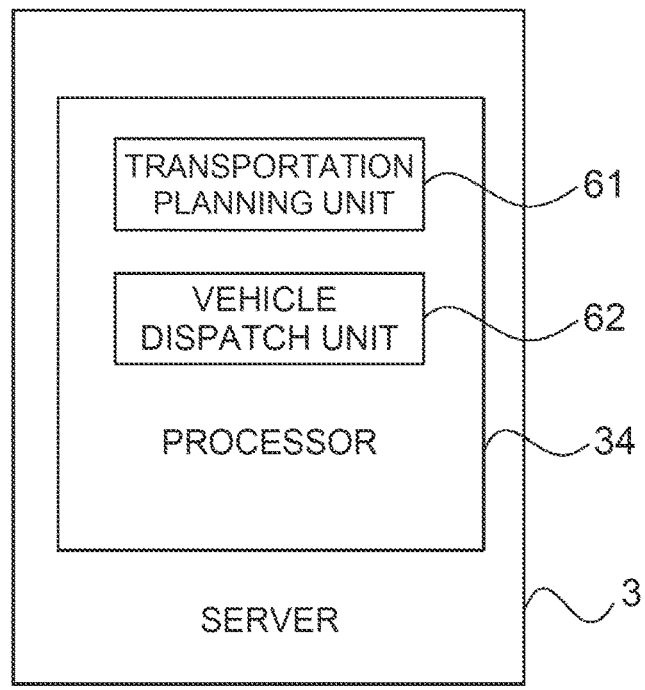
FIG. 10 is a functional block diagram of the processor of the server in a third embodiment.

FIG. 10 is a functional block diagram of the processor 34 of the server 3 in the third embodiment. In the third embodiment, the processor 34 has a vehicle dispatch unit 62 in addition to the transportation planning unit 61. The transportation planning unit 61 and the vehicle dispatch unit 62 are functional modules that are implemented when the processor 34 of the server 3 executes computer programs stored in the storage device 32 of the server 3. The transportation planning unit 61 and the vehicle dispatch unit 62 may be implemented by dedicated operation circuits provided in the processor 43.

The vehicle dispatch unit 62 dispatches a vehicle to the via-point determined by the transportation planning unit 61. In other words, the vehicle dispatch unit 62 directs another vehicle other than the vehicle 2 to the via-point in order to transport normal passengers to the destination. This makes it possible to secure modes for transportation for the normal passengers. It is also possible to select any place other than the bus stop or taxi stand as the via-point.

For example, the vehicle dispatch unit 62 communicates with another vehicle waiting in a garage via the communication network 4 and transmits vehicle dispatch information to the other vehicle. The vehicle dispatch information includes position information on the via-point or the like. The other vehicle that picks up the normal passengers may be an automated vehicle that travels autonomously or a vehicle that is manually driven.

Moreover, the vehicle 2 may be communicable with the other vehicle via the communication network 4 and the wireless base station 5, and the processor 43 of the ECU instead of the processor 34 of the server 3 may have the vehicle dispatch unit.

Fourth Embodiment

The passenger transportation system according to a fourth embodiment is basically similar in configuration and control to the passenger transportation system according to the first embodiment except for the points described below. Therefore, the fourth embodiment of the disclosure will be described with the focus being on the difference from the first embodiment.

Figure 11:
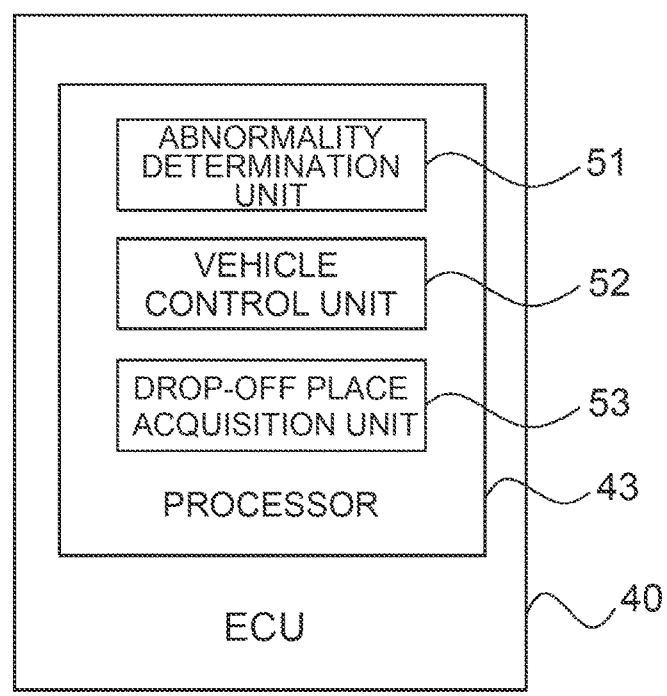
FIG. 11 is a functional block diagram of the processor of the ECU in a fourth embodiment.

FIG. 11 is a functional block diagram of the processor 43 in the ECU 40 in the fourth embodiment. In the fourth embodiment, the processor 43 has a drop-off place acquisition unit 53 in addition to the abnormality determination unit 51 and the vehicle control unit 52. The abnormality determination unit 51, the vehicle control unit 52, and the drop-off place acquisition unit 53 are functional modules that are implemented when the processor 43 of the ECU 40 executes computer programs stored in the memory 42 of the ECU 40. Each of these functional modules may be implemented by a dedicated operation circuit provided in the processor 43.

The drop-off place acquisition unit 53 acquires desired drop-off places of the passengers in the vehicle 2. For example, the passengers input desired drop-off places into the input-output device 27, and the drop-off place acquisition unit 53 acquires the desired drop-off places of the passengers via the input-output device 27. The desired drop-off places are input into the input-output device 27 by inputting characters, inputting voice, selecting a bus stop on the service route, or the like.

As described before, when a passenger feeling unwell is present, the normal passengers are dropped off at a via-point, and then the passenger feeling unwell is transported to a medical facility. However, when the desired drop-off places of some normal passengers are ahead of the medical facility, it is not necessarily a convenient choice for the normal passengers to leave the vehicle at the via-point.

Accordingly, in the fourth embodiment, when a bus stop on the service route closest to the medical facility is ahead of the current position of the vehicle 2 and behind the desired drop-off places of the normal passengers, the vehicle control unit 52 of the vehicle 2 directs the vehicle 2 to the desired drop-off places of the normal passengers after the vehicle 2 arrives at the medical facility. This makes it possible to perform efficient transportation in consideration of the desired drop-off places of the normal passengers. For example, when, in the situation shown in FIG. 8, the hospital B closest to the bus stop BS5 is selected as the medical facility, and the desired drop-off place of some normal passengers is a bus stop BS6 ahead of the bus stop BS5, the vehicle control unit 52 directs the vehicle 2 to the bus stop BS6 after the vehicle 2 arrives at the hospital B.

Figure 12:
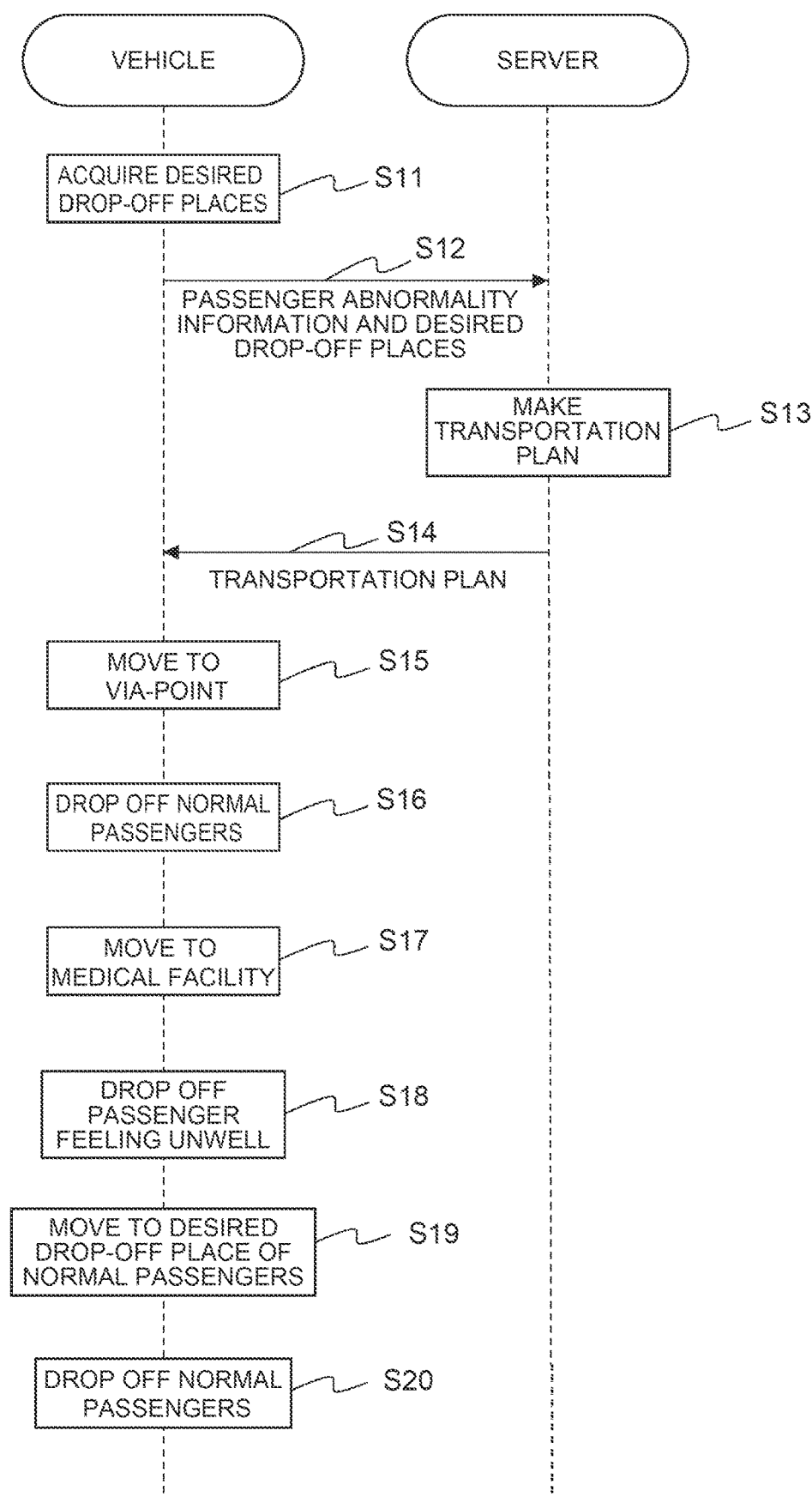
FIG. 12 is a sequence diagram showing an example of the operation of the passenger transportation system according to the fourth embodiment of the disclosure.

FIG. 12 is a sequence diagram showing an example of the operation of the passenger transportation system 1 according to the fourth embodiment of the disclosure. In the sequence diagram, communication between the vehicle 2 and the server 3 is performed via the communication network 4 and the wireless base station 5.

In the fourth embodiment, when it is determined in the control routine in FIG. 6 that a passenger feeling unwell is present, the drop-off place acquisition unit 53 of the vehicle 2 acquires desired drop-off places of the normal passengers (S11). For example, when it is determined that the passenger feeling unwell is present, the drop-off place acquisition unit 53 prompts the normal passengers to input desired drop-off places by voice or the like via the input-output device 27, and acquires the desired drop-off places input into the input-output device 27 by the normal passengers.

The passengers may input the desired drop-off places into the input-output device 27 when they board the vehicle 2. The passengers may also input the desired drop-off places into the mobile terminals of the passengers before boarding the vehicle 2. In this case, when it is determined that the passenger feeling unwell is present, the drop-off place acquisition unit 53 acquires the desired drop-off places from the mobile terminals of the normal passengers.

As in step S1 of FIG. 7, the abnormality determination unit 51 of the vehicle 2 transmits passenger abnormality information to the server 3, and the drop-off place acquisition unit 53 of the vehicle 2 transmits the desired drop-off places of the normal passengers to the server 3 (step S12).

Upon reception of the passenger abnormality information and the desired drop-off places from the vehicle 2, the transportation planning unit 61 of the server 3 makes a transportation plan to transport the passenger feeling unwell in the vehicle 2 to a medical facility (step S13). In this case, as in step S2 of FIG. 7, the transportation planning unit 61 determines the medical facility and the via-point, and generates a travel route from the current position of the vehicle 2 to the medical facility via the via-point. When a bus stop on the service route closest to the medical facility is ahead of the current position of the vehicle 2 and behind the desired drop-off place of some normal passengers, the transportation planning unit 61 also generates a travel route from the medical facility to the desired drop-off place.

Steps S14 to S18 are performed as in the case of steps S3 to S7 in FIG. 7. In the fourth embodiment, after dropping off the passenger feeling unwell, the vehicle 2 travels toward the desired drop-off place of the normal passengers (step S19). Specifically, the vehicle control unit 52 of the vehicle 2 causes the vehicle 2 to travel from the medical facility to the desired drop-off place along the travel route transmitted from the server 3.

The vehicle 2 then drops off the normal passengers from the vehicle 2 when arriving at the desired drop-off place (step S20). For example, the vehicle control unit 52 of the vehicle 2 stops the vehicle 2 at the desired drop-off place, and uses the door actuator in the actuator 26 to open the doors of the vehicle 2 for a prescribed time. In this case, the vehicle control unit 52 may determine whether or not the passengers have left the vehicle based on the output of the passenger state detector 23. The vehicle control unit 52 may also prompt the passengers to leave the vehicle by using the input-output device 27 or by voice or display.

After the normal passengers are dropped off, the vehicle 2 returns to normal operation, and travels to an end point along the travel route, or travels from the desired drop-off place to the garage. When the desired drop-off places of all the passengers other than the passenger feeling unwell are ahead of the bus stop closest to the medical facility, the vehicle 2 may travel to the medical facility without going through the via-point, and then travel from the medical facility to the desired drop-off places.

Moreover, instead of the processor 43 of the ECU 40, the processor 34 of the server 3 may have the drop-off place acquisition unit. In this case, the drop-off place acquisition unit of the server 3 acquires the desired drop-off places of the normal passengers from the output of the input-output device 27 transmitted from the vehicle 2.

Fifth Embodiment

The passenger transportation system according to a fifth embodiment is basically similar in configuration and control to the passenger transportation system according to the first embodiment except for the points described below. Therefore, the fifth embodiment of the disclosure will be described with the focus being on the difference from the first embodiment.

Figure 13:
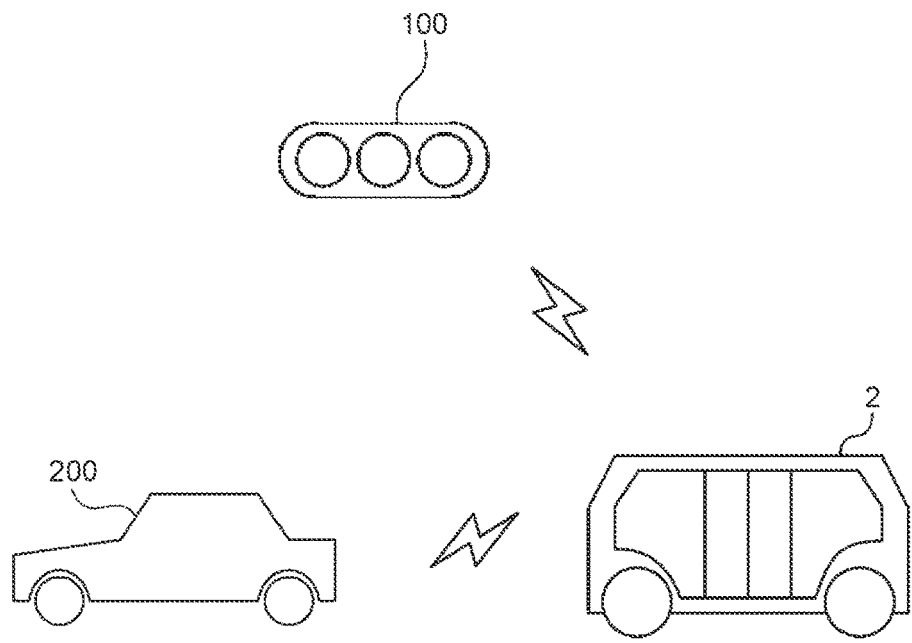
FIG. 13 schematically shows a communication state of the vehicle using a communication device.

In the fifth embodiment, the vehicle 2 can communicate with a traffic signal 100 and another vehicle 200 as shown in FIG. 13. For example, the vehicle 2 communicates with the traffic signal 100 by short-distance radio communication using the communication device 28 of the vehicle 2, and communicates with the other vehicle 200 by vehicle-to-vehicle communication using the communication device 28 of the vehicle 2.

Figure 14:
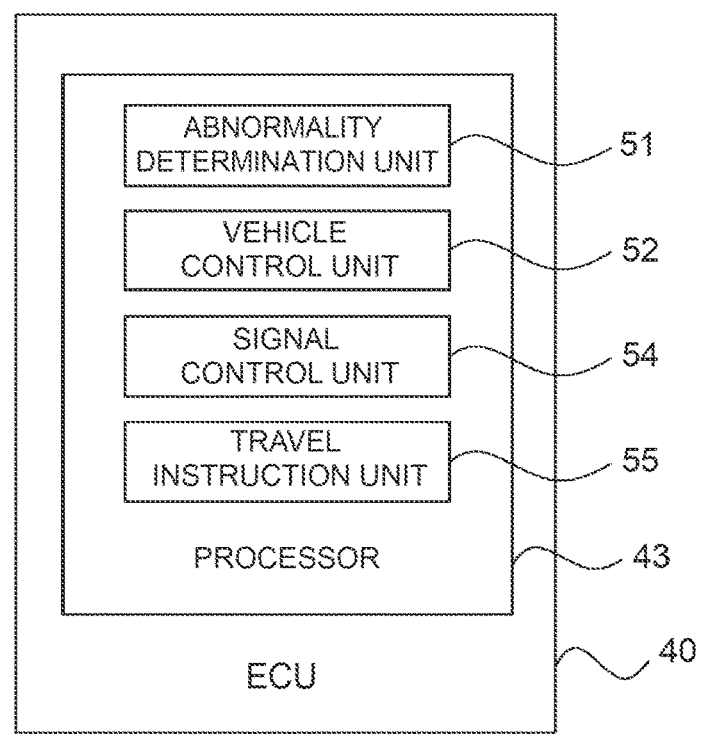
FIG. 14 is a functional block diagram of the processor of the ECU in a fifth embodiment.

FIG. 14 is a functional block diagram of the processor 43 in the ECU 40 in the fifth embodiment. In the fifth embodiment, the processor 43 has a signal control unit 54 and a travel instruction unit 55 in addition to the abnormality determination unit 51 and the vehicle control unit 52. The abnormality determination unit 51, the vehicle control unit 52, the signal control unit 54, and the travel instruction unit 55 are functional modules that are implemented when the processor 43 of the ECU 40 executes computer programs stored in the memory 42 of the ECU 40. Each of these functional modules may be implemented by a dedicated operation circuit provided in the processor 43.

The signal control unit 54 controls a lighting state of the traffic signal 100. For example, the signal control unit 54 controls the lighting state of the traffic signal 100 by transmitting a control signal to the traffic signal 100 by short-distance radio communication. The travel instruction unit 55 transmits a travel instruction to the other vehicle 200 other than the vehicle 2 by vehicle-to-vehicle communication between the vehicle 2 and the other vehicle 200.

As described before, when a passenger feeling unwell is present, the passenger feeling unwell is transported to a medical facility by the vehicle 2. In this case, it is desirable to be able to quickly transport the passenger feeling unwell regardless of traffic conditions.

Accordingly, the signal control unit 54 controls the lighting state of the traffic signal 100 such that the vehicle 2 does not stop at the traffic signal 100 when the vehicle 2 transports the passenger feeling unwell to the medical facility.

This makes it possible to shorten the time taken to arrive at the medical facility. For example, the signal control unit 54 transmits a control signal to the traffic signal 100 ahead of the vehicle 2 such that the light of the traffic signal 100 turns green when the vehicle 2 passes. The traffic signal 100 controls the lighting timing of the traffic signal 100 in response to the control signal.

The travel instruction unit 55 provides a travel instruction to the other vehicle 200 so as to prevent the other vehicle 200 from being located ahead of the vehicle 2 when the vehicle 2 transports the passenger feeling unwell to the medical facility. This makes it possible to shorten the time taken to arrive at the medical facility. For example, the travel instruction unit 55 transmits the travel route of the vehicle 2 to the other vehicle 200 around the vehicle 2 in order to instruct the other vehicle 200 not to travel on the travel route of the vehicle 2. When the other vehicle 200 is an automated vehicle, the other vehicle 200 resets the travel route of the other vehicle 200 so as not to travel on the travel route of the vehicle 2.

Note that one of the signal control unit 54 and the travel instruction unit 55 may be omitted. Moreover, the server 3 may be communicable with the traffic signal 100 via the communication network 4, and the processor 34 of the server 3 instead of the processor 43 of the ECU 40 may have the signal control unit. In this case, the signal control unit of the server 3 receives the current position of the vehicle 2 from the vehicle 2 at prescribed intervals, and transmits a control signal to the traffic signal 100 ahead of the vehicle 2. The signal control unit of the server 3 may control the lighting state of the traffic signal 100 via a traffic control center that transmits a control signal to the traffic signal 100.

Moreover, the server 3 may be communicable with the other vehicle 200 via the communication network 4 and the wireless base station 5, and the processor 34 of the server 3 instead of the processor 43 of the ECU 40 may have the travel instruction unit. In this case, the travel instruction unit of the server 3 receives the current position of the vehicle 2 from the vehicle 2 at prescribed intervals, and transmits the travel route of the vehicle 2 to the other vehicle 200 around the vehicle 2. When the other vehicle 200 is an automated vehicle, the travel instruction unit of the server 3 may generate a travel route of the other vehicle 200 such that the travel route of the other vehicle 200 does not include the travel route of the vehicle 2, and transmit the generated travel route of the other vehicle 200 to the other vehicle 200.

Other Embodiments

Although the embodiments of the disclosure have been described in the foregoing, it should be understood that the disclosure is not limited to the embodiments disclosed and various changes and modifications are possible without departing from the range of the appended claims. For example, the vehicle 2 may be an on-demand bus or an automated taxi that operates according to the demand of users.

The computer programs that enable computers to implement the functions of the various parts of the processor 43 of the ECU 40 or the processor 34 of the server 3 may be provided in the form of being stored in a computer-readable recording storage medium. For example, the computer readable recording medium is a magnetic recording medium, an optical recording medium, or a semiconductor memory.

The embodiments disclosed can be implemented in any combination. For example, in the case of combining the second embodiment with the third embodiment, the fourth embodiment, or the fifth embodiment, the control routine in FIG. 9 instead of the control routine in FIG. 6 is executed as the abnormality determination process.

What is claimed is:

1. A passenger transportation system including a vehicle that is able to transport a plurality of passengers by autonomous traveling and a server communicable with the vehicle, comprising:
a vehicle processor configured to determine whether or not a passenger feeling unwell is present in the vehicle; and
a server processor configured to determine, when it is determined that the passenger feeling unwell is present, a medical facility to which the passenger feeling unwell is transported and a via-point where normal passengers are dropped off;
the vehicle processor configured to control the vehicle to travel so as to transport the passenger feeling unwell to the medical facility via the via-point; and
the vehicle processor configured to acquire desired drop-off places of the passengers in the vehicle, wherein:
the vehicle is a route bus having a service route of the vehicle determined in advance; and
when a bus stop on the service route closest to the medical facility is ahead of a current position of the vehicle and behind one of the desired drop-off places of the normal passengers, the vehicle processor directs the vehicle to the one of the desired drop-off places after the vehicle arrives at the medical facility.

2. The passenger transportation system according to claim 1, wherein the vehicle processor is configured to monitor states of the passengers in the vehicle, detect a passenger suspected of feeling unwell based on the states of the passengers, and request other passengers to confirm whether or not the detected passenger feels unwell.

3. The passenger transportation system according to claim 1, wherein when it is determined that the passenger feeling unwell is present and then the passenger feeling unwell in the vehicle refuses transportation to the medical facility, the vehicle processor cancels transportation to the medical facility.

4. The passenger transportation system according to claim 1, wherein the server processor is configured to dispatch a vehicle to the via-point.

5. The passenger transportation system according to claim 1, wherein:
the server processor selects a bus stop on the service route of the vehicle as the via-point.

6. The passenger transportation system according to claim 5, wherein the server processor selects a bus stop that is located ahead of the current position of the vehicle on the service route and closest to the current position of the vehicle as the via-point.

7. The passenger transportation system according to claim 1, wherein the vehicle processor is configured to control a lighting state of a traffic signal, wherein the vehicle processor controls the lighting state of the traffic signal such that the vehicle does not stop at the traffic signal when the vehicle transports the passenger feeling unwell to the medical facility.

8. The passenger transportation system according to claim 1, wherein the vehicle processor is configured to provide a travel instruction to another vehicle other than the vehicle, wherein
the vehicle processor provides a travel instruction to the other vehicle so as to prevent the other vehicle from being located ahead of the vehicle when the vehicle transports the passenger feeling unwell to the medical facility.

9. A method of passenger transportation using a vehicle that is able to transport a plurality of passengers by autonomous traveling, comprising:
   determining whether or not a passenger feeling unwell is present in the vehicle;
   determining, when it is determined that the passenger feeling unwell is present, a medical facility to which the passenger feeling unwell is transported and a via-point where normal passengers are dropped;
   controlling the vehicle to travel so as to transport the passenger feeling unwell to the medical facility via the via-point; and
   acquiring desired drop-off places of the passengers in the vehicle, wherein:
      the vehicle is a route bus having a service route of the vehicle determined in advance; and
      when a bus stop on the service route closest to the medical facility is ahead of a current position of the vehicle and behind one of the desired drop-off places of the normal passengers, directing the vehicle to the one of the desired drop-off places after the vehicle arrives at the medical facility.

10. A vehicle controller provided in a vehicle that is able to transport a plurality of passengers by autonomous traveling, comprising a vehicle processor configured to:
   determine whether or not a passenger feeling unwell is present in the vehicle;
   determine, when it is determined that the passenger feeling unwell is present, a medical facility to which the passenger feeling unwell is transported and a via-point where normal passengers are dropped;
   control the vehicle to travel so as to transport the passenger feeling unwell to the medical facility via the via-point; and
   acquire desired drop-off places of the passengers in the vehicle, wherein:
      the vehicle is a route bus having a service route of the vehicle determined in advance; and
      when a bus stop on the service route closest to the medical facility is ahead of a current position of the vehicle and behind one of the desired drop-off places of the normal passengers, direct the vehicle to the one of the desired drop-off places after the vehicle arrives at the medical facility.

* * * * *